(12) United States Patent
Chen

(10) Patent No.: US 8,730,013 B2
(45) Date of Patent: May 20, 2014

(54) RFID-BASED BOOK TAGGING DEVICE AND METHOD

(75) Inventor: Horng-Ji Chen, Hsinchu (TW)

(73) Assignee: Claridy Solutions, Inc., Hsinchu (TW)

( * ) Notice: Subject to any disclaimer, the term of this patent is extended or adjusted under 35 U.S.C. 154(b) by 409 days.

(21) Appl. No.: 13/242,718

(22) Filed: Sep. 23, 2011

(65) Prior Publication Data

US 2012/0299703 A1 Nov. 29, 2012

(30) Foreign Application Priority Data

May 24, 2011 (TW) .............................. 100118084 A

(51) Int. Cl.
*G06K 7/01* (2006.01)

(52) U.S. Cl.
USPC ........................................ 340/10.1; 235/375

(58) Field of Classification Search
USPC ................ 340/10.1, 10.2, 10.3, 10.31, 10.32, 340/10.34, 10.4, 10.42, 10.5, 10.51, 10.52, 340/10.6, 572.1, 572.4, 572.7, 572.8; 235/375, 492
See application file for complete search history.

(56) References Cited

U.S. PATENT DOCUMENTS

| | | | | |
|---|---|---|---|---|
| 6,486,780 B1* | 11/2002 | Garber et al. | .............. | 340/572.1 |
| 6,704,690 B2* | 3/2004 | Koh et al. | ...................... | 702/188 |
| 2008/0217409 A1* | 9/2008 | Ito et al. | .......................... | 235/440 |
| 2009/0072952 A1* | 3/2009 | Niiyama et al. | ........... | 340/10.51 |
| 2010/0019482 A1* | 1/2010 | Kumagai et al. | ................. | 283/72 |

* cited by examiner

*Primary Examiner* — Nabil Syed

(57) ABSTRACT

The present invention relates to a radio frequency identification (RFID) device and method for book tagging, using which a RFID tag which is designed to attach to a book is first being scanned and detected in view of optimizing the RFID tag's signal strength and its effective reading rate as well so as to determine a position on the book for the RFID tag to attach thereat while allowing the detection to the RFID tag to be prevented from being adversely affected by metals or magnetic materials that are situated ambient to the book.

6 Claims, 6 Drawing Sheets

RFID-BASED BOOK TAGGING DEVICE AND METHOD

FIELD OF THE INVENTION

The present invention relates to an RFID-based book tagging device and method, and more particularly, to an RFID-based book tagging plan for performing operations including: verifying functions of an RFID tag while establishing a link between the RFID tag and a database, detecting an RFID tag so as to determine a position on a book for the RFID tag to attach thereat with optimal detection result, making an evaluation for checking whether an RFID tag is capable of working normally after being attached to a book.

BACKGROUND OF THE INVENTION

Radio-frequency identification (RFID) is a technology that uses communication via radio waves to exchange data between a reader and an electronic tag attached to an object, for the purpose of identification and tracking. Generally, an radio-frequency identification system involves RFID readers, RFID tags, and an application system. It is noted that the RFID system can be designed to operate using RFID tags of different radio frequencies under different regulations, including low-frequency (LF) RFID tags at 134 KHz typically, high-frequency (HF) RFID tags at 13.56 MHz, ultra-high-frequency (UHF) RFID tags at 860~960 MHz, and microwave RFID tags at 2.4 GHz, and so on. The passive RFID tags have no power source internally and require an external electromagnetic field, that is mostly emitted from RFID readers, to power and activate an internal analog circuit embedded in the passive RFID tags for the chip operations. Generally, such an RFID tag can be embedded with memories for data storage, and the memories can be read-only memories (ROM), write-once-read-many (WORM) memories or electrically erasable programmable read-only memories (EEPROM). Since the passive RFID tags and readers utilize the electromagnetic waves to transfer energy and signals, and their signal transmission performance, especially the frequency response of the RFID tags' antennas, can easily be affected by the material characteristics of the objects on which the RFID tags are attached, or even by the metallic objects as well as the conductive materials that are located neighboring thereto. That is, the metallic objects as well as the conductive materials, whichever are distributed neighboring to an RFID tags, will cause an interference phenomenon to be generated by a degree depending on the volume/area of those objects and also the distances there between, that will affect the reading performance of the RFID system. Moreover, since the electromagnetic waves used for signal transmission in the RFID system are invisible waves, neither the constructive interference nor the destructive interference caused by those surrounding metallic objects or conductive materials are not perceptible. Consequently, it can be a very time consuming job just to determine where and how to attach a passive RFID tag on an object in those conventional RFID systems, since it is simply a try-and-error task that the passive RFID tag usually will have to be attached to the object again and again at different positions for obtaining different reading rates accordingly so as to be used as base for locating a most appropriate position on the object for the RFID tag to attach thereto.

Generally, in a conventional RFID system, whether an RFID tag is fabricated with good quality for enabling the same to function normally, or whether the RFID tag is placed at an appropriate location or simply being placed properly can be determined according to its received signal strength indication (RSSI) or its read rate, and in a situation when the RSSI is weak or the read rate is poor while it is assured that the RFID tag is not working properly, it can be determined that the RFID tag is not located correctly and should be moved to other position. However, a common RFID tag is not built to be attached to and detached from an object repetitively in the above-mentioned try-and-error manner so as to be placed properly that the RFID tag can be damaged during the repetitive processes, and moreover, such repetitive attaching and detaching will wear down the adhesion of the RFID tag, and thus the RFID tag might lose accidently and unintentionally even after being positioned properly. Nevertheless, no matter the RFID tag is damaged during the repetitive processes or is moved accidently and unintentionally even after being positioned properly, there is a conceivable waste in resource, time and manpower already.

In most library RFID management systems, the RFID tags being used are usually high-frequency (HF) RFID tags, and the energy transmission and data exchange are achieved by magnetic coupling between coil antennas of the RFID reader and tags. For enabling a sufficient long detection range of each such high-frequency RFID tags, the coil embedded therein should be built with a larger area, and causing the weight of the HF RFID tag comparatively heavier. Consequently, the resulting larger and heavier high-frequency RFID tag will have to be arranged at the insertion of the inner side of front or back cover, which causes the high-frequency RFID tag to be in danger of being tear off or being unintentionally bended.

Moreover, most books generally have staples embedded therein as one of the easiest ways nowadays to bind a book is to staple it, and also there is usually a magnetic stripe attached to the spine of each library book. It is noted that those metallic staples and magnetic stripes will adversely affect the performance of the RFID tags. Therefore, if the RFID tags are not scanned and detected in advance for attaching the same to their corresponding books at proper positions in view of preventing any destructive interference to be induced by those staples and magnetic stripes, the read rates of those RFID tags can be very low while being detected to be used in library management processes such as sorting and homing books, inventory and security detection, etc. In addition, the attaching of an RFID tag to a book might be a difficult task if the book that is opened for the tag attaching can easily close itself up automatically when it is not fixedly secured by holding devices since most books are flexible. Moreover, since the RFID tags for books are generally being made slim and narrow and also they should be attached at positions as close to the spine of book as possible, it is difficult to attach such the RFID tags to books manually. Conventionally, books in most libraries had already been attached with barcodes while being cataloging. However, since such barcodes are positioned randomly and thus the books will required to be read by barcode readers in an one-by-one manner manually for converting the barcode management system to an RFID management system, it can be a very labor intensive job.

SUMMARY OF THE INVENTION

In view of the disadvantages of prior art, the primary object of the present invention is to provide an RFID-based book tagging device and method for performing a book tagging plan including: verifying functions of an RFID tag while establishing a link between the RFID tag and a database; securing a book by the use of a page holder; providing a bracket for holding barcode reader while enabling the orientation angle and the level thereof to be adjustable; detecting an RFID tag so as to determine a position on a book for the RFID tag to attach thereat with optimal detection result; providing a tag mover to be used for moving an RFID tag horizontally; and making an evaluation for checking whether an RFID tag is capable of working normally after being attached to a book.

During the performing of the book tagging plan, an RFID tag should be enabled to access to the book information of a book which it is attached thereof, whereas the book information includes: barcode number, classification number, location and book status, etc., while enabling the RFID tag to connect to an integrated library system (ILS) database through a digital communication interface for transmitting the accessed bookinformation to the ILSdatabase, or enabling the RFID tag to connected to a memory device, such as a SD card, a CF card, an XD card, or an USB flash memory, and thereby, registering the accessed book information into a database. It is noted that almost all the books in libraries are being attached with their individual international standard book numbers (ISBN) or barcodes. However, since different books can be different in size and in style, there can be a huge difference in where the ISBNs or barcodes are positioned on the books. Moreover, in order to facilitate the reading of such barcodes using a barcode reader while preventing the intense light emitted from the barcode reader from shooting directly into the eyes of an user, the barcode reader is generally being mounted on an adjustable bracket for holding the barcode reader at a specific height while enabling the light thereof to project downward and thus scanning the barcodes effectively. After the barcode of a book is scanned, the book information corresponding to the barcode can be retrieved from an external database or a built-in database and then encoded into the memory area or the read/write memory area of the RFID tag according to a specific encoding rule, while enabling the RFID tag to connected to a database so as to register the retrieved book information therein simultaneously. It is noted that according to the types of the RFID tag and the applications thereof, the book information can be encoded into a format of RFID UID (unique identification code) or a format of EPC (electronic product code) so as to be registered into the memory of the RFID tag, while enabling the RFID tag to connected to a database so as to register the retrieved book information therein simultaneously. In addition, it is important to perform an evaluation for verifying and checking whether the RFID tag is capable of working normally.

The RFID tag used in the present invention is substantially a narrow bar-like ultra-high-frequency (UHF) RFID tags that is small in area and light in weight for enabling the same to be attached to any page of a book at a position not being blocked by the magnetic stripe of the book. Moreover, if the RFID tag is located proximate to the spine of the book, not only its invisibility is greatly enhanced, but also the probability of being tearing apart or being bended is also greatly reduced. Generally, since all the pages in a book are bound tightly to each other at positions proximate to the spine of the book, it is noted that an open book can easily close itself up automatically when it is not secured by hand or by holding units, and thus the attaching of the RFID tag to an open book that is not secured by hand or by holding devices can be a difficult task. After the open book is hold by a holding unit, a tag mover is used for enabling the RFID tag to move about the area proximate to the spine of the book so as to attach the RFID tag to a chosen secured and invisible position near the spine of the book.

During the performing of the book tagging plan, first an RFID tag is placed inside an RFID scanning zone while the barcode of a book is being read so as to obtain a book information relating to the book from a database according to the barcode, and then the book information is encoded using an RFID reader so as to be registered into a memory embedded inside the RFID tag. Thereafter, the RFID tag is tested for determining whether the RFID tag is able to function normally, i.e. whether the RFID tag is qualified, and if the RFID tag is not able to function normally, i.e. it is not qualified, a new RFID tag is used for replacing the unqualified RFID tag and then repeating the aforesaid processes. On the other hand, if the tested RFID tag is qualified, the RFID tag is removed temporarily for allowing the book to be placed inside the RFID scanning zone in a manner that the spine of the book is disposed abutting against a positioning plate disposed inside the RFID scanning zone while allowing the upper half of the open book to be orientated directly under a page holder, and then the RFID tag that was removed is placed on the open book. Thereafter, the qualified RFID tag that is placed on the open book is scanned and detected by an RFID reader in view of optimizing the RFID tag's signal strength and its effective reading rate as well so as to determine a position on the book for the RFID tag to attach thereat, since the RFID tag is still capable of moving horizontally before being fixedly attached to the book until it reaches a position where the signal strength and the read rate that are displayed on a built-in displaying unit or external displaying unit, such as LCD and CRT, are optimized. It is noted that the displaying unit can use different color combinations of a plurality of light indicators in conjunction with certain audio components to represent various detected results in view of different signal strengths and read rates that are corresponding to different positions of the RFID tag, and therefore, the color combinations and audio sounds emitted from the displaying unit can be used as reminders or alarms that can be very helpful to the determination of the RFID tag's position.

After the RFID tag is fixedly attached to the book, the RFID-based book tagging device of the invention will initiate another scanning process upon the RFID tag in view of optimizing the RFID tag's signal strength and its effective reading rate so as to make an evaluation for verifying whether the tagging of the RFID tag on the book is completed correctly. However, since different books can be different in size and in thickness, their magnetic stripes that are embedded in the books and those metallic objects used for binding the books can be different in size and especially in position. It is noted that books whichever already have magnetic stripes embedded therein can have their magnetic stripes to be attached to any pages thereof at any random positions, e.g. one can have its magnetic stripe attached at page 5 at the top thereof while another can have its magnetic stripe to be attached to page 200 at the bottom thereof, not to mention that different magnetic stripes can be built with different lengths and thicknesses. With the RFID-based book tagging device and method of the invention, one can assure that each and every RFID tag can be attached to their corresponding target object at positions with optimized signal response, and thus the performance of each RFID tag is optimized. Moreover, it is noted that the detected results in view of different signal strengths and read rates that are obtained during the scanning of the RFID tag while the RFID tag is being driven to move can be recorded and registered into the database so as to be used in an optimization control analysis.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
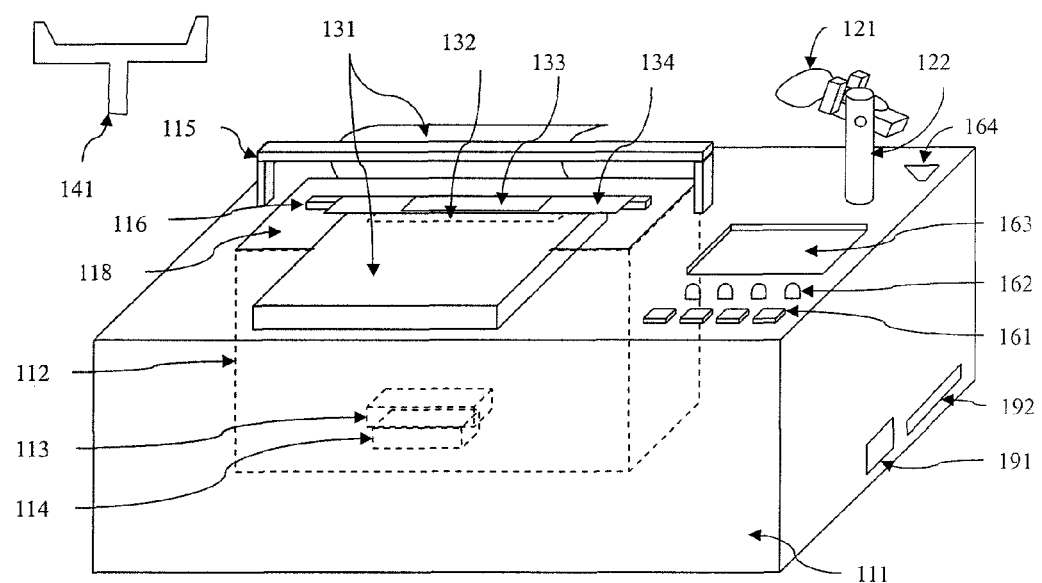
FIG. 1 is a schematic diagram showing an RFID-based book tagging device according to the present invention.
Figure 2:
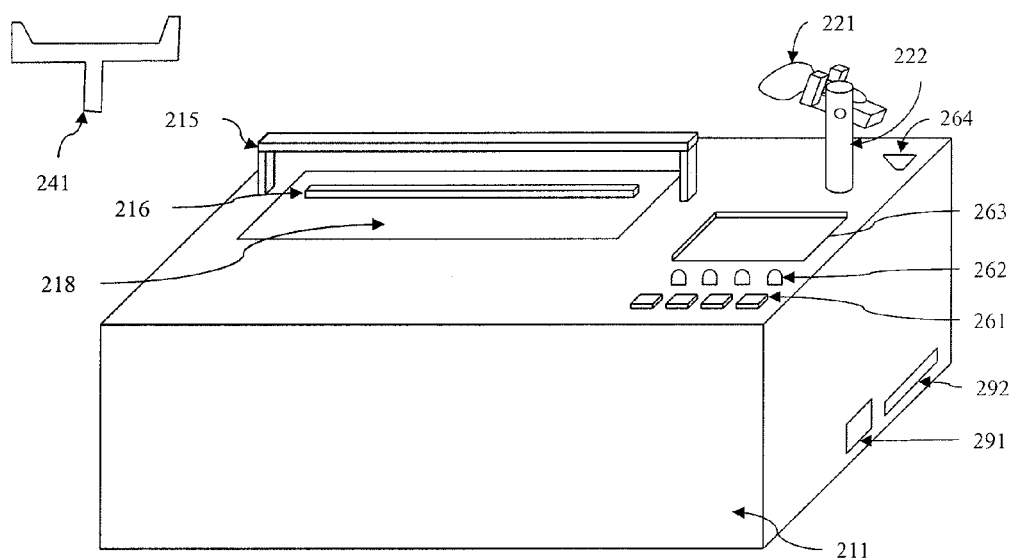
FIG. 2 is a three-dimensional view of an RFID-based book tagging device according to the present invention.
Figure 7:
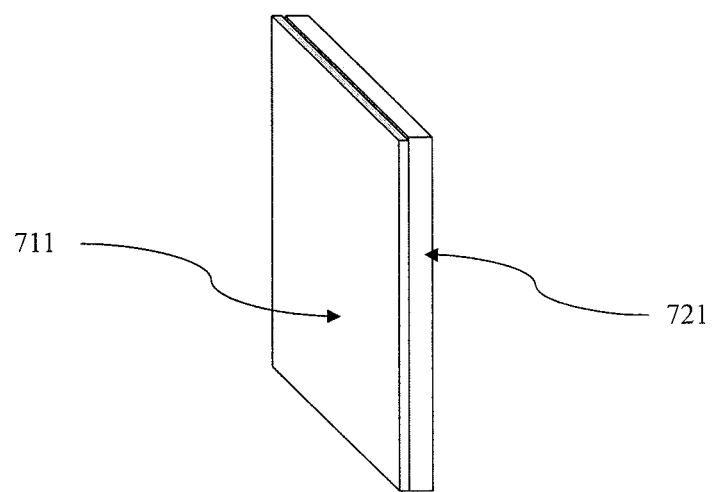
FIG. 7 is a schematic diagram showing how a metal plate of the shielding box is attached with an electromagnetic wave absorbing material in the present invention.

Please refer to FIG. 1 and FIG. 2, which are a schematic diagram and a three-dimensional diagram showing an RFID-based book tagging device according to the present invention. As shown in FIG. 1 and FIG. 2, the RFID-based book tagging device includes a shielding box 112 which has at least one antenna 113 disposed therein. It is noted that each of the antenna 113 can either be integrated with an RFID reader 114, or can be electrically connected to the RFID reader 114 by a coaxial cable. In a condition when the antenna 113 is electrically connected to the RFID reader 114 by a coaxial cable, the RFID reader 114 can be disposed either inside the shielding box 112 or outside the shielding box at will as required, whichever is capable of functioning normally for accessing to RFID tags disposed inside the shielding box 112. Please refer to FIG. 6A~FIG. 6D, which are a side view, a three-dimensional view, a front view, a top view of a shielding box used in the present invention. In FIG. 6A~FIG. 6D, the antenna, as those antennas 611, 612, 613 and 614 shown respectively in FIG. 6A~FIG. 6D, is disposed inside the shielding box, as those shielding boxes 621, 622, 623, 624 shown respectively in FIG. 6A~FIG. 6D, whereas the front plate, the rear plate, the left plate, the right plate and the bottom plate of the shielding box are all made of metallic materials for preventing any electromagnetic waves from being transmitted out of the shielding box therethrough. In addition, there is an RFID scanning zone formed on the top of the shielding box, as those RFID scanning zones 632, 634 shown respectively in FIG. 6B and FIG. 6D, which can be formed as a window on the shielding box or can be a plate made of a non-metallic material, whichever is capable of allowing the antenna to transmit and receive electromagnetic waves therethrough. Please refer to FIG. 7, which is a schematic diagram showing how a metal plate of the shielding box is by a wave absorbing plate in the present invention. In FIG. 7, each of the interior walls 721 of the shielding box is further being covered by a wave absorbing plate 711 for reducing the interference and reflection of electromagnetic waves inside the shielding box so as to enhance the reading accuracy toward RFID tags that are disposed inside the shielding box. Moreover, the shielding box 112 is received inside an enclosure case, as those enclosure cases 111, 211 shown respectively in FIG. 1 and FIG. 2, which can be made of any material available. However, if the enclosure case is made of metal, its top plate or the portion, as the two portions 118, 218 shown respectively in FIG. 1 and FIG. 2, directly above the RFID scanning zone formed on top of the shielding box should be made of a non-metallic material for allowing electromagnetic wave to be transmitted therethrough. In addition, in the RFID-based book tagging device of the present invention, there is a displaying/indication unit 163, 263 mounted on the surface of the enclosure case 111. 211, which can be a displaying unit providing an indication relating to the testing of the RFID tag. The display unit can be configured with a light indicator 162, 262 selected from the group consisting of: an indicator composed of lights of different colors, and an indicator composed of lights flashing at different frequencies. Moreover, the displaying/indication unit 163, 263 further comprises an indication unit, being substantially an audio device 164, 264 capable of outputting a series of audio signals, sounds of different frequencies, sound streams with different tempos, or music of different melodies, whichever is capable of pointing out the status relating to the testing to the RFID tag. In an embodiment of the invention, the audio device 164, 264 can be a speaker or a buzzer. As shown in FIG. 1 and FIG. 2, the RFID-based book tagging device further comprises: at least one press-key 161, 261, mounted on the surface of the enclosure case for activating controls relating to the book tagging operation, such as code reading, encoding and detecting; and a digital interface 191, 291, being a device selected from the group consisting of: an Ethernet device, an RS-232 interface device, an RS-485 interface device, an RS-422 interface device and an USB interface device, whichever is capable of establishing a link to an ILS system, a computer or a server. In an embodiment of the invention, the RFID-based book tagging device can use the digital interface to connected to a memory card, such as an SD card, a CF card, an XD card and an USB flash memory, so as to transmit any book information stored in the memory card to the RFID-based book tagging device. Since different books can be different in size and in thickness, there can be a huge difference in where the barcodes are positioned on the books. Accordingly, the RFID-based book tagging device of the present invention has its barcode reader 121, 221 to be mounted on an adjustable bracket 122, 222, by that barcodes at any position can be read without trouble. Operationally, the accessed barcode is used in a connection to a database for obtaining a book information, and then the book information is encoded and registered into a memory of the RFID tag while enabling the RFID tag to connect to a database so as to register the retrieved book information therein simultaneously. For accelerating the book tagging operation, the RFID-based book tagging device further comprises: a position plate 116, 216, disposed at a position inside the RFID scanning zone 218 op top of the shielding box 112, or at the top plate of the enclosure case 111, 211, which can be used for guiding the book to be positioned correctly for the book tagging operation. It is noted that the positioning of the positioning plate 116, 216 is determined according to the reading efficiency of the RFID tag. Moreover, there is a page holder 115, 215 being disposed at a position corresponding to the backward of the positioning plate 116, 216, which is used for enabling an open book to maintain open so as to facilitate the detection of RFID tag attached to the book. Nevertheless, if there is even on magnetic stripe embedded inside the book, the signal strength of the RFID tag will be affected, and for addressing the matter, a tag mover 141, 241 is provided in a manner that it can be arranged engaging to the release paper 134 if an RFID tag 133 so as to bring along the RFID tag 133 to move therewith horizontally on top of the open book while allowing the RFID reader to interrogate with the antenna so as to scan the RFID tag 133 in view of the signal strength and read rate detection. Thereafter, the RFID-based book tagging device will initiate a book tagging operation for attaching the RFID tag 133 to the open book at the moment when the detected signal strength and read rate reaches a predefined criteria. It is noted that the predefined criteria can be determined according to operation conditions including: the antenna design, the sensitivity of the RFID chip and the configuration of the RFID-based book tagging device.

Figure 3A:
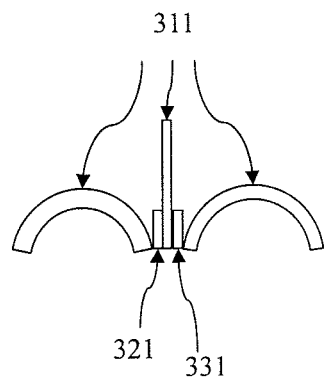
FIG. 3A is a top view of an open book being placed on the RFID-based book tagging device in view of the relative positioning of a magnetic stripe and an RFID tag that are attached to the book at different pages.
Figure 3B:
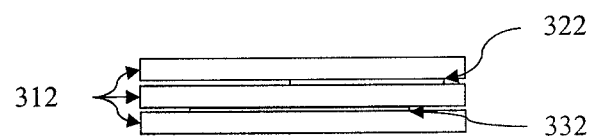
FIG. 3B is a side view of a close book being placed on the RFID-based book tagging device in view of the relative positioning of a magnetic stripe and an RFID tag that are attached to the book at different pages.
Figure 3C:
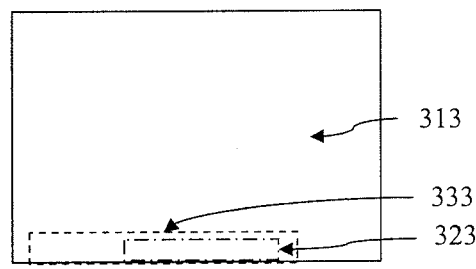
FIG. 3C is a top view of a close book being placed on the RFID-based book tagging device in view of the relative positioning of a magnetic stripe and an RFID tag that are attached to the book at different pages.

FIG. 3A is a top view of an open book being placed on the RFID-based book tagging device in view of the relative positioning of a magnetic stripe and an RFID tag that are attached to the book at different pages. FIG. 3B is a side view of a close book being placed on the RFID-based book tagging device in view of the relative positioning of a magnetic stripe and an RFID tag that are attached to the book at different pages. FIG. 3C is a top view of a close book being placed on the RFID-based book tagging device in view of the relative positioning of a magnetic stripe and an RFID tag that are attached to the book at different pages. In FIG. 3A, there are metallic objects 331, such as magnetic stripes, staples, or even metallic printings, and an RFID tag 321 being arranged on different pages of an open book 311. In FIG. 3B, the book 312 that is closed and already has a magnetic stripe 332 and an RFID tag 322 embedded therein can have the magnetic stripe 332 and the RFID tag 322 to be attached to any pages thereof at any random positions, e.g. the RFID tag 322 can have its magnetic stripe attached at page 5 at the top of the close book 312 while the magnetic stripe 333 can be attached to page 200 at the bottom of the close book 312. In FIG. 3C, although the magnetic stripe 333 and the RFID tag 323 are attached to different pages of the close book 313, they can be arranged overlapping with each other in portion on the top view. Thus, by attaching the RFID tag 321, 322, 323 to a page different from that of the magnetic stripe 331, 332, 333, and also by enabling the RFID tag 321, 322, 323 to move horizontally above the open book relative to the magnetic stripe 331, 332, 333, the RFID-based book tagging device and method of the invention can assure to find a position on the book for allowing the RFID tag 321, 322, 323 to attach thereat with optimized signal response, and thus the performance of the RFID tag 321, 322, 323 is optimized.

Figure 4A:
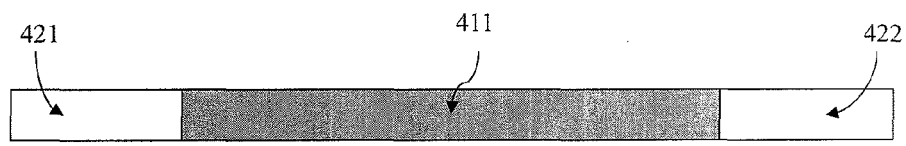
FIG. 4A and FIG. 4B are schematic diagrams showing an RFID tag used in the present invention.
Figure 4B:
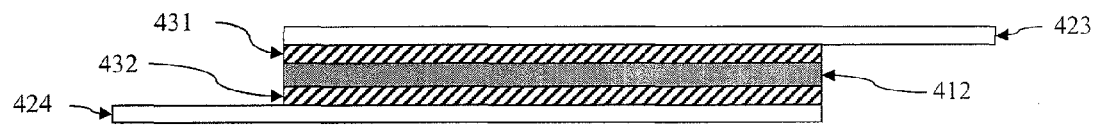

Please refer to FIG. 4A and FIG. 4B, which are schematic diagrams showing an RFID tag used in the present invention. As shown in FIG. 4A and FIG. 4B, for facilitating the horizontal moving and the tagging of the RFID tag 411, 412, the RFID tag 411 has two release papers 421, 422 to be adhered respectively on the top and bottom of the same in a manner that the two release papers 421, 422 are arranged extruding out of the RFID tag 411, 412 as the two release paper 421, 422 is formed longer than the RFID tag 411, 412. It is noted that the length of each release paper 421, 422 can be determined according to actual requirement only if it can facilitate the horizontal moving and the tagging of the RFID tag 411, 412. In FIG. 4B, the configuration, from top to bottom, includes: an upper release paper 423, an upper adhesive layer 431, an RFID tag 412, a lower adhesive layer 432 and a lower release paper 424. However, if there is only one surface of the RFID tag 412 that is designed to attached to a target object, the configuration can include only the upper release paper 423, the upper adhesive layer 431, and the RFID tag 412, without the lower adhesive layer 432 and the lower release paper 424, or vice versa.

Figure 5:
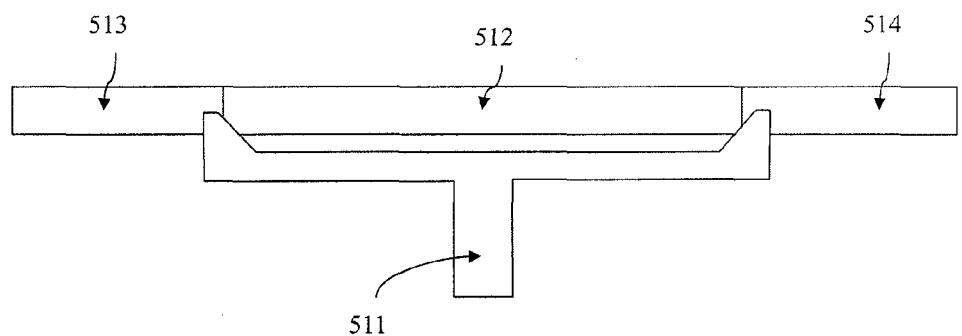
FIG. 5 is a schematic diagram showing a tag mover of the present invention.
Figure 6A:
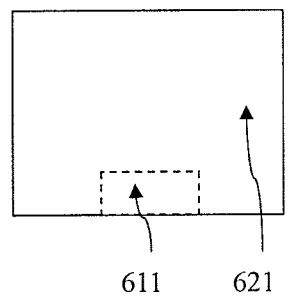
FIG. 6A~FIG. 6D are a side view, a three-dimensional view, a front view, a top view of a shielding box used in the present invention.
Figure 6B:
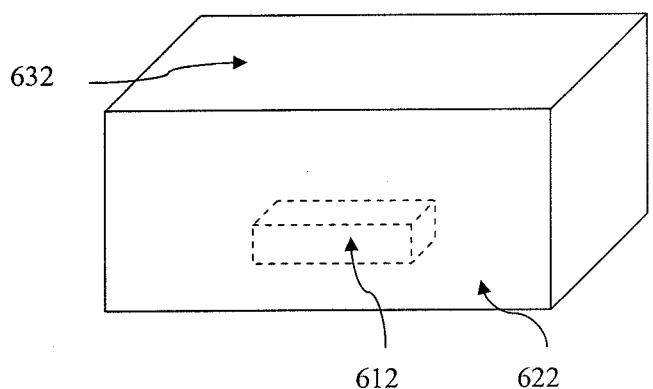
Figure 6C:
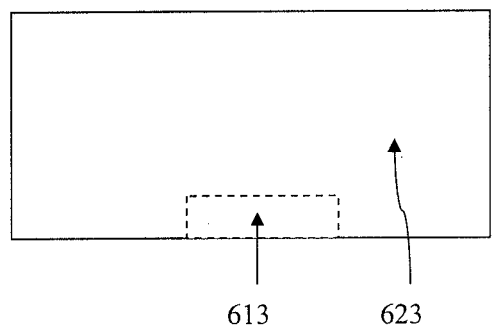
Figure 6D:
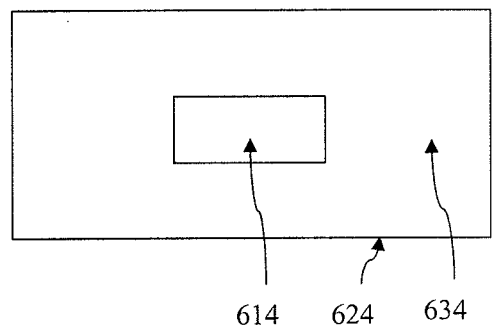

Please refer to FIG. 5, which is a schematic diagram showing a tag mover of the present invention. As the configuration of the RFID tag used in the present invention includes the upper and lower release papers 513, 514, the RFID tag is not easy to be moved inside the book simply by hand. Thus, the RFID-based book tagging device further comprises: a tag mover 511, provided for moving an RFID tag toward the spine of the book while driving the RFID tag to move horizontally to the left or right of the book. The tag mover can be formed into any shape at will, only if it is configured with at least two terminals to be used for engaging with the RFID tag during the use of the tag mover for driving the RFID tag to move horizontally. It is noted that by widening each of the two terminals, the area of engagement between the tag mover 511 and the RFID tag is increased and thus it is easily for the tag mover to drive the RFID tag over the book page to get the proper attachment location. However, by narrowing each of the two terminals, the tag mover will be easily separated from the tag during the tag attachment process since the area of engagement between the tag mover 511 and the RFID tag is decreased. Moreover, the two terminals and the handle of the tag mover can be integrally formed, or can be formed according to a modular design as required.

Consequently, the detection results obtaining from the step of performing a data accessing test upon an RFID tag, the step of moving of the RFID tag relative to the book while performing a scanning operation upon the moving RFID tag, and the step of the scanning and detecting of the RFID tag that is attached to the book in view of its signal strength and read rate so as to verify whether the signal strength and read rate of the RFID tag reaches the predefined criteria are all being stored in a test information database or a test information file which can be used in an optimization control analysis.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An RFID-based book tagging method, comprising the steps of:
   using an RFID-based book tagging device to perform a data accessing test upon an RFID tag;
   using a barcode reader to read a barcode of a book so as to obtain a book information relating to the book from a database according to the barcode, and then encoding the book information so as to be registered into a memory embedded inside the RFID tag for establishing a data linkage between the book and the RFID tag;

using a tag mover to move the RFID tag relative to the book while performing a scanning operation upon the RFID tag while being moved, and after completing the scanning operation, attaching the RFID tag on the book; and performing a book tagging test;

wherein the moving of the RFID tag relative to the book while performing the scanning operation upon the moving RFID tag further comprises the steps of:

opening and placing the book inside an RFID scanning zone while enabling the same to abut tightly against a positioning plate;

disposing the RFID tag whose data linkage had already been verified on the open book while enabling the same to move relative to the book;

using the RFID-based book tagging device to scan and detect the RFID tag in view of its signal strength and read rate; and enabling the RFID-based book tagging device to issue a reminding signal at the moment when the detected signal strength and read rate reaches a predefined criteria and then stopping the RFID tag movement at the position where the RFID tag meets the predefined criteria; and doing a book tagging operation for attaching the RFID tag to the book at the stopping position.

2. The RFID-based book tagging method of claim 1, wherein the data accessing test further comprises the steps of:

using the RFID-based book tagging device to access data stored in the memory of the RFID tag; and using the RFID-based book tagging device to scan and detect the RFID tag in view of the signal strength and read rate so as to determine whether the RFID tag is capable of working normally, qualified, to be used in posterior operations.

3. The RFID-based book tagging method of claim 1, wherein the reading of the barcode of the book using the barcode reader further comprises the steps of:

establishing a link to the database for retrieving the book information corresponding to the barcode from the database and then encoding the book information using a specific encoding rule so as to be registered into the memory of the RFID tag; and accessing the memory of the RFID tag to obtain the book information so as to verify the data linkage to the RFID tag.

4. The RFID-based book tagging method of claim 1, wherein after completing the tag attaching operation, the RFID-based book tagging device is activated for scanning and detecting the RFID tag which is attached to the book in view of its the signal strength and read rate so as to verify whether the signal strength and read rate of the RFID tag reaches the predefined criteria.

5. The RFID-based book tagging method of claim 1, wherein the tag mover is configured with at least two terminals to be used for engaging with the RFID tag during the use of the tag mover for driving the RFID tag to move horizontally.

6. The RFID-based book tagging method of claim 1, wherein the detection results obtaining from the step of performing a data accessing test upon an RFID tag, the step of moving of the RFID tag relative to the book while performing a scanning operation upon the moving RFID tag, and the step of the scanning and detecting of the RFID tag that is attached to the book in view of its signal strength and read rate so as to verify whether the signal strength and read rate of the RFID tag reaches the predefined criteria are all being stored in a test information database or a test information file which can be used in an optimization control analysis.

* * * * *